United States Patent [19]
Koenig et al.

[11] 3,867,095
[45] Feb. 18, 1975

[54] SHRINKPROOFING OF WOOL WITH CYCLIC ACID ANHYDRIDES AND ZINC ACETATE

[75] Inventors: Nathan H. Koenig, Albany; Mendel Friedman, Moraga, both of Calif.

[73] Assignee: The United States of America as represented by the Secretary of Agriculture, Washington, D.C.

[22] Filed: Mar. 16, 1973

[21] Appl. No.: 342,135

[52] U.S. Cl. .................................. 8/128 R, 8/127.6
[51] Int. Cl. ...................... D06m 3/02, D06m 13/00
[58] Field of Search .......................... 8/128 R, 127.6

[56] References Cited
UNITED STATES PATENTS

| 2,515,181 | 7/1950 | Barnes | 8/128 R |
|---|---|---|---|
| 2,986,445 | 5/1961 | Koenig | 8/128 R |
| 3,097,052 | 7/1963 | Koenig | 8/128 R |
| 3,433,576 | 3/1969 | Tesoro | 8/128 R |
| 3,749,553 | 7/1973 | Koenig et al | 8/127.6 |

OTHER PUBLICATIONS
Textile Research Journal, Reaction Of Zinc Acetate With Wool Carboxyl Groups Derived From Cyclic Anhydrides, N. H. Koenig and M. Friedman, Vol. 42, II, p. 646 (Nov. 1972).

Journal Text. Inst., The Structure of Textile Fibers, etc., R. L. Wormell, Vol. 41, p. 16 (Jan. 1950).

Text. Res. J., Setting Characteristics of Metal-Containing Wool Fibers, Vol. 35, I, p. 578 (June 1965).

Textile Res. J., Wool Modification with Acid Anhydrides in Dimethylformamide, N. H. Koenig, Vol. 35, II, p. 706 (Aug. 1965).

*Primary Examiner*—Richard D. Lovering
*Assistant Examiner*—T. S. Gron
*Attorney, Agent, or Firm*—M. Howard Silverstein; Max D. Hensley; William Takacs

[57] ABSTRACT

Wool is modified by a two-step process in which the wool is successively reacted with a cyclic acid anhydride and zinc acetate. The modified wool is much more resistant to laundering shrinkage than is normal wool.

5 Claims, No Drawings

SHRINKPROOFING OF WOOL WITH CYCLIC ACID ANHYDRIDES AND ZINC ACETATE

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates broadly to the chemical modification of wool. In particular, the invention concerns and has as its prime object the provision of novel processes for shrinkproofing wool wherein wool is chemically modified by reaction with a cyclic acid anhydride and zinc acetate. Further objects of the invention will be evident from the following description wherein parts and percentages are by weight unless otherwise specified.

Although wool is a very useful fiber, it is often desirable to improve its properties for particular applications by chemically modifying it. In U.S. Pat. No. 2,986,445, Koenig has shown that wool may be chemically modified by reacting it with an organic acid anhydride in the presence of N,N-dimethylformamide (hereinafter referred to as DMF). However, only aliphatic acid anhydrides containing eight carbons or more impart shrinkproofing properties to the wool. Indeed, although wool will combine with approximately 15% of a low-molecular weight anhydride, such as succinic anhydride or citraconic anhydride, the so-treated wool does not exhibit resistance to shrinkage.

The invention described herein provides the means for obviating the problem outlined above. In accordance with the invention, wool is chemically modified by a two-step procedure of (1) reacting the wool with a cyclic acid anhydride and (2) reacting the so-treated wool with zinc acetate.

A primary advantage of the invention is that it yields modified wool which is much more resistant to shrinkage when laundered than normal (unmodified) wool. Moreover, this desirable effect is attained even with the use of anhydrides which contain less than eight carbon atoms, e.g., succinic, glutaric, and citraconic anhydrides.

Another advantage of the invention is that the improvement is essentially permanent; the treated materials do not lose their new properties after long use or cleaning, but retain these properties for the life of the material.

A further advantage of the invention is that the modified wool retains its flexibility so that it is useful for all the conventional applications as in fabricating garments, blankets, etc.

DETAILED DESCRIPTION OF THE PROCESS

In the first step of the process of the invention, dry wool is reacted, in the presence of DMF, with a cyclic acid anhydride. Particularly preferred for the purpose of the invention are the aliphatic anhydrides which contain less than eight carbon atoms, for example, succinic anhydride, glutaric anhydride, adipic anhydride, pimelic anhydride, maleic anhydride, and citraconic anhydride. The anhydride may be a hydrocarbon acid anhydride or may contain substituents on the hydrocarbon residue such as halogen (chlorine, bromine, iodine, or fluorine), ether groups, ester groups, carboxy groups, etc.

The reaction may be carried out as described in Pat. No. 2,986,445, and, in general, the reaction conditions such as proportions of reactants, temperature, time, etc. may be varied as described below.

The anhydride is generally employed in an amount of about 10 to 100%, based on the weight of the wool, and is applied to the wool together with DMF which acts as a solvent for the anhydride and as a reaction promoter. Usually, one uses about 1 to 10 parts of DMF per part of anhydride.

The reaction is carried out at about 25°–135°C. The reaction rate increases with increasing temperature, and a preferred range to expedite the reaction without damage to the wool is 100° to 120°C.

The time of reaction will depend on such conditions as the proportion of DMF, the temperature of reaction, the reactivity of the anhydride selected, and the degree of modification desired. Thus, the reaction may take anywhere from a few minutes to several hours. In general, the reaction is continued for a time necessary to yield an uptake of anhydride by the wool of about from 1 to 35%, preferably about 5–15% (based on the weight of wool).

After reaction of the wool with the anhydride, the chemically-modified wool is preferably treated to remove unreacted anhydride. Thus, the wool may be treated as by wringing, passage through squeeze rolls, centrifugation, etc., to remove the excess reagent. In place of such mechanical treatment, or in conjunction therewith, the modified wool may be extracted with an inert volatile solvent such as trichloroethylene, benzene, acetone, methyl ethyl ketone, carbon tetrachloride, alcohol, etc. to ensure removal of unreacted anhydride.

In the second step of the process of the invention, the anhydride-modified wool is reacted with zinc acetate in the presence of DMF.

The anhydride-modified wool which is employed in the reaction may be in a dry condition, or, preferably, it may contain the normal amount of water—usually about 10 to 15%—that is present when the material is held in air.

The reaction conditions such as proportion of reactants, temperature, time, etc. may be varied as described below.

The zinc acetate is generally employed in an amount of about 10 to 100%, based on the weight of the wool, and is applied together with DMF, which acts as a reaction promoter. Usually, one uses about 5 to 15 parts of DMF per part of wool.

The reaction is carried out at about 25°–135°C. The reaction rate increases with increasing temperature, and a preferred range to expedite the reaction without damage to the wool is 100° to 120°C.

The time of reaction will depend on such conditions as the proportion of DMF, the temperature, and the degree of modification desired. Thus, the reaction may take anywhere from a few minutes to several hours. In general, reaction is continued for a time necessary to yield a weight increase by the wool of about from 5 to 35%, preferably about 15 to 30% (based on the original weight of unmodified wool).

After reaction of the anhydride-modified wool with zinc acetate, the chemically-modified wool is preferably treated to remove excess zinc acetate and DMF.

Thus, the wool may be treated as mentioned earlier, i.e., by wringing, passage through squeeze rolls, centrifugation, or the like to remove excess materials. In place of such mechanical action, or following it, the product may be extracted with an inert volatile solvent such as trichloroethylene, benzene, acetone, methyl ethyl ketone, carbon tetrachloride, alcohol, etc. Successive extractions with different solvents may be used to ensure complete removal of all unreacted materials. It is preferred to employ these solvents in a hot condition to facilitate extraction of the excess reactants. The treated wool is then dried in the usual way.

The primary advantage of the invention is that the modified wool is more resistant to laundering shrinkage. The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the products of the invention indicate actual chemical combination of the wool with the anhydride and the zinc acetate (or at least the zinc moiety thereof) has taken place, it is not known for certain what is the mechanism involved. It is believed, however, that in the first step reaction with the anhydride introduces new carboxyl groups into the wool molecules, and in the second step binding of zinc to these carboxy groups results in a cross-linking effect. It may be, however, that the other reactions occur and it is not intended to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

EXAMPLES

The invention is further demonstrated by the following illustrative examples.

The wool used in the experiments set forth below was scoured, undyed wool, exhaustively extracted with trichloroethylene, followed by ethanol, then dried. The fabric was cut into 8-cm. circular samples for the treatments. All weight increases are given on a dry wool basis.

The shrinkage tests were conducted as follows: Measured fabric samples, including an untreated wool control, were violently agitated in an "Accelerator" at 1,780 rpm for 2 minutes at 39°–40°C. with 200 ml. of 0.5% aqueous sodium oleate solution. After this laundering operation, the samples were remeasured to determine area shrinkage.

EXAMPLE 1

A. Replicate samples of dried wool fabric (1.2 g.), succinic anhydride (1.0 g.), and DMF (6 ml.) were placed in covered (but unsealed) Petri dishes and held in an oven at 110°C. for 45 minutes. The treated wool samples were successively extracted with warm methyl ethyl ketone and hot ethanol to remove unreacted reagents. After the samples were dried, the weight increase and the shrinkage were measured. The results are tabulated below.

B. A sample of dried, modified wool prepared as described above was allowed to equilibrate in air such that its natural content of moisture was reached. This sample, 1.0 g. of zinc acetate, and 6 ml. of DMF were heated in a Petri dish at 110°C. for 45 minutes. The so-treated wool was extracted as described above and dried. The weight increase and the shrinkage were determined. The results, summarized below, show the improvement in shrinkage properties that results when wool is treated by the two-step process of the invention.

| Treatment | Weight increase* (%) | Area shrinkage (%) |
| --- | --- | --- |
| A. Succinic anhydride in DMF | 17 | 44 |
| B. Succinic anhydride in DMF followed by zinc acetate in DMF | 33 | 3 |
| C. No treatment (control) | — | 47 |

* Based on the original weight of unmodified dry wool.

EXAMPLE 2

A. Replicate samples of dried wool fabric (1.2 g.), citraconic anhydride (1.0 ml.), and DMF (6 ml.) were heated in Petri dishes at 110°C. for 60 minutes. The treated wool samples were extracted as in Example 1 and dried. The weight increase and shrinkage are summarized below.

B. A so-modified wool sample was allowed to equilibrate in air to restore its ordinary content of moisture, and then heated with 1.0 g. of zinc acetate and 6 ml. of DMF in a Petri dish at 110°C. for 45 minutes. The treated wool was extracted as in Example 1 and the weight increase and shrinkage were measured. The results are tabulated below.

| Treatment | Weight increase* (%) | Area shrinkage (%) |
| --- | --- | --- |
| A. Citraconic anhydride in DMF | 11 | 43 |
| B. Citraconic anhydride in DMF followed by zinc acetate in DMF | 25 | 3 |
| C. No treatment (control) | — | 43 |

* Based on the original weight of unmodified dry wool.

EXAMPLE 3

Hereinabove, it has been explained that in the second step of the process of the invention, the anhydride-modified wool is reacted with zinc acetate. Our investigations have also shown that the related compound, cadmium acetate, can be used in place of zinc acetate. However, in such case a lower shrinkage protection is achieved even with a higher uptake of the cadmium compound. Our investigations have further shown that metal salts other than zinc and cadmium acetates are inoperative. This is illustrated by the following experiments.

Samples of succinic anhydride-modified wool were prepared as described in Example 1, Part A. Each sample of modified wool (1.5 g.) was then reacted with 1 g. of a candidate metal salt and 6 ml. of DMF at 110°C. for 45 minutes. The products were extracted as described in Example 1, Part A and measured for weight increase and for shrinkage. The results are tabulated below.

| Anhydride | Metal salt | Weight increase* % | Area shrinkage % |
|---|---|---|---|
| Succinic | None | 17 | 44 |
| do. | Zinc acetate | 33 | 3 |
| do. | Cadmium acetate | 39 | 20 |
| do. | Zinc chloride | 17 | 39 |
| do. | Calcium acetate | 18 | 37 |
| None | None | — | 44 |

* Based on the original weight of unmodified dry wool.

Having thus described our invention, we claim:

1. A process for chemically modifying wool, thereby increasing its resistance to shrinkage, which comprises
   a. reacting wool under essentially anhydrous conditions, in the presence of N,N-dimethylformamide, with a cyclic acid anhydride, at a temperature about from 25° to 135°C. until the wool combines with about from 1 to 35% of its weight of the acid anhydride, and
   b. reacting the so-modified wool, in the presence of N,N-dimethylformamide, with a compound selected from the group consisting of zinc acetate and cadmium acetate at a temperature about from 25° to 135°C. until there is attained a weight increase by the wool of about from 5 to 35%.

2. The process of claim 1 wherein the cyclic acid anhydride contains less than eight carbon atoms.

3. A process for chemically modifying wool, thereby increasing its resistance to shrinkage, which comprises
   a. reacting wool under essentially anhydrous conditions, in the presence of N,N-dimethylformamide, with an aliphatic cyclic acid anhydride containing less than eight carbon atoms at a temperature about from 25° to 135°C. until the wool combines with about from 1 to 35% of its weight of the acid anhydride,
   b. removing excess reactants from the so-treated wool, and
   c. reacting the so-treated wool, in the presence of N,N-dimethylformamide, with zinc acetate, at a temperature about from 25° to 135°C until there is attained a weight increase by the wool of about from 5 to 35%.

4. The process of claim 3 wherein the anhydride is succinic anhydride.

5. The process of claim 3 wherein the anhydride is citraconic anhydride.

* * * * *